(12) United States Patent
Deschenaux

(10) Patent No.: US 12,548,076 B2
(45) Date of Patent: Feb. 10, 2026

(54) CASCADING INITIAL PUBLIC OFFERINGS OR SPECIAL PURPOSE ACQUISITIONS COMPANIES FOR CORPORATE CAPITALIZATION

(71) Applicant: Marc R. Deschenaux, Geneva (CH)

(72) Inventor: Marc R. Deschenaux, Geneva (CH)

( * ) Notice: Subject to any disclaimer, the term of this patent is extended or adjusted under 35 U.S.C. 154(b) by 3 days.

(21) Appl. No.: 17/890,668

(22) Filed: Aug. 18, 2022

(65) Prior Publication Data

US 2023/0056462 A1 Feb. 23, 2023

Related U.S. Application Data

(60) Provisional application No. 63/235,121, filed on Aug. 19, 2021.

(51) Int. Cl.
*G06Q 40/04* (2012.01)
*G06Q 20/38* (2012.01)

(52) U.S. Cl.
CPC ........... *G06Q 40/04* (2013.01); *G06Q 20/389* (2013.01)

(58) Field of Classification Search
CPC ..................................................... G06Q 40/00
USPC ......................................................... 705/35
See application file for complete search history.

(56) References Cited

U.S. PATENT DOCUMENTS

| | | | | |
|---|---|---|---|---|
| 5,956,687 A * | 9/1999 | Wamsley | ............... | G06Q 40/08 715/208 |
| 5,991,733 A * | 11/1999 | Aleia | ............... | G06Q 10/06311 707/999.107 |
| 6,687,708 B1 * | 2/2004 | Brobst | ................... | G06Q 30/04 |
| 7,107,239 B2 * | 9/2006 | Graff | ...................... | G06Q 40/03 705/36 R |
| 7,167,839 B1 * | 1/2007 | Layne | ................... | G06Q 20/102 705/40 |
| 7,191,150 B1 * | 3/2007 | Shao | ...................... | G06Q 40/08 705/36 R |
| 7,392,201 B1 * | 6/2008 | Binns | ..................... | G06Q 10/04 600/300 |
| 7,624,031 B2 * | 11/2009 | Simpson | ................ | G06Q 40/08 705/2 |
| 7,840,397 B2 * | 11/2010 | Chiou | ..................... | G06F 30/33 702/120 |
| 8,364,571 B1 * | 1/2013 | Sroka | ..................... | G06Q 40/04 705/37 |
| 8,589,269 B1 * | 11/2013 | Bendel | ................... | G06Q 40/06 705/35 |
| 10,146,792 B1 * | 12/2018 | Dobrek | ..................... | H04L 9/32 |
| 2001/0005836 A1 * | 6/2001 | Yang | ...................... | G06Q 40/03 705/38 |
| 2002/0002475 A1 * | 1/2002 | Freedman | .............. | G06Q 40/02 705/4 |
| 2002/0059139 A1 * | 5/2002 | Evans | .................. | G06Q 20/102 705/40 |
| 2002/0099596 A1 * | 7/2002 | Geraghty | ........... | G06Q 30/0204 705/7.33 |

(Continued)

*Primary Examiner* — Kirsten S Apple
(74) *Attorney, Agent, or Firm* — Reed Smith LLP; Lisa A. Chiarini; Richard J. Brown

(57) ABSTRACT

A computerized system with hardware and specialized software components for developing, executing and administering sale of securities for raising capital by an incubator financing company wherein a portion of the proceeds of the sale of securities is used temporarily to fund a subsequent company.

9 Claims, 10 Drawing Sheets

(56) References Cited

U.S. PATENT DOCUMENTS

| | | | | |
|---|---|---|---|---|
| 2005/0108063 A1* | 5/2005 | Madill | G06Q 40/08 | 705/4 |
| 2005/0228747 A1* | 10/2005 | Gumport | G06Q 40/00 | 705/37 |
| 2007/0043659 A1* | 2/2007 | Kass | G06Q 40/03 | 705/38 |
| 2007/0288272 A1* | 12/2007 | Marks | G06Q 10/10 | 705/4 |
| 2008/0082436 A1* | 4/2008 | Shalen | G06Q 40/04 | 705/37 |
| 2008/0086314 A1* | 4/2008 | Fitzpatrick | G06Q 50/26 | 705/4 |
| 2008/0120246 A1* | 5/2008 | Sopinsky | G06Q 40/06 | 705/37 |
| 2008/0147207 A1* | 6/2008 | D'Mura | G05B 19/056 | 700/20 |
| 2008/0270318 A1* | 10/2008 | Wilson | G06Q 40/04 | 705/37 |
| 2009/0164360 A1* | 6/2009 | Yoon | G06Q 40/06 | 705/37 |
| 2010/0250466 A1* | 9/2010 | Joseph | G06Q 40/08 | 705/37 |
| 2010/0268554 A1* | 10/2010 | Hoffman | G06Q 40/08 | 705/4 |
| 2011/0202445 A1* | 8/2011 | Torres | G06Q 50/18 | 705/37 |
| 2012/0226595 A1* | 9/2012 | Torres | G06Q 40/06 | 705/37 |
| 2013/0035965 A1* | 2/2013 | Wood | G06Q 10/00 | 705/4 |
| 2014/0143106 A1* | 5/2014 | Fox | G06Q 40/00 | 705/35 |
| 2016/0203556 A1* | 7/2016 | Lipper, III | G06Q 40/06 | 705/36 R |
| 2017/0103469 A1* | 4/2017 | Jiao | G16H 20/70 | |
| 2018/0130135 A1* | 5/2018 | Norwicke | G06Q 50/186 | |
| 2019/0080405 A1* | 3/2019 | Molinari | H04L 9/3297 | |
| 2019/0340689 A1* | 11/2019 | Gordon, III | G06Q 20/0658 | |
| 2020/0051067 A1* | 2/2020 | Overholser | G06F 16/1834 | |
| 2022/0130005 A1* | 4/2022 | Xu | G06Q 30/00 | |

* cited by examiner

CASCADING INITIAL PUBLIC OFFERINGS OR SPECIAL PURPOSE ACQUISITIONS COMPANIES FOR CORPORATE CAPITALIZATION

CROSS REFERENCE TO RELATED APPLICATION

This application claims the benefit of U.S. Provisional Application Ser. No. 63/235,121 filed Aug. 19, 2021, the contents of which are incorporated herein in their entirety.

FIELD OF THE DISCLOSURE

Systems and methods are disclosed which generally relate to raising capital.

BACKGROUND

The main barriers preventing an Initial Public Offering (IPO) to happen for a company which is ready, willing and able to pursue it include the following: the preparation cost of an IPO is prohibitive; there is no guarantee that the IPO will succeed; and bankers and other professionals putting their career at stake will not authorize the IPO without proper due diligence ensuring financial securities markets' safety, validation of the business model; sufficient revenue making the company at least cash-flow positive and if not profitable; strong and stable growth.

In other words, there must be no doubt that the company is on its road to success.

Large corporations are able establish new businesses by self-funding new businesses from proceeds of more established businesses. Using the analogy of a train, the financial power of a corporation relies on momentum built on all businesses in an organization. The core company is the locomotive, being well-established, with market credibility and cash flow due to its mature segments. Businesses within the corporate structure are analogous to railway cars. Established businesses are close to the locomotive, self-supportive, with positive cash flows and profitability that can contribute resources to later less-established businesses. Using this model, the corporation can use the cash flow of its best-performing segments to finance new businesses. New businesses added by the corporation are funded by the revenues from the core and established segments of the company until they become profitable themselves and can contribute positively to the corporation's revenue. Additionally, investors are more likely to invent in shares of the corporation because of its proven track record of driving businesses to success.

Small or start-up companies with a high profitability potential that merit investment banking services may not be able afford them due to costs prior to the distribution of the securities, especially pertaining to the preparation and drafting of disclosures. Almost by definition, a company seeking an IPO does not have sufficient revenue to support a business until it reaches profitability, nor does it have expertise in completing regulatory and disclosure requirements. It is like a boxcar on a siding without a locomotive to pull it onto the mainline of financial success.

Further, in addition to significant cost, it monopolizes a significant portion of the company's resources and the management's attention. That is why it is not uncommon that during the capitalization (e.g. IPO) process, the performance of the company is heavily impacted. Hence, there may be an additional need for funding, if only to offset the poor sales performance due to the effort of the capitalization or IPO process.

Therefore, it is desirable to develop new systems and methods for raising capital for small companies.

SUMMARY

One aspect of the disclosure provides a system for providing a cascading funding platform, the system comprising: a first processor configured to determine a funding event, a second processor configured to determine an initial public offering; a distributed ledger; a cascading funding platform operationally connected to the first processor, the second processor and the distributed ledger, the cascading funding platform configured to receive, from the first processor, the funding event; generate, based on the funding event, a message related to an initial subscriber offering to fund a first company; send the message to one or more networked nodes associated with one or more subscribers of the platform; receive bids to purchase funding tokens via the one or more networked nodes from the one or more subscribers in response to the message; record bids for the funding tokens and respective allocated tokens determined by a central processor to the distributed ledger, wherein the distributed ledger is accessible by the one or more networked nodes; receive from the second processor a first initial public offering for the first company; generate, based on the first initial public offering event, a message related to the first initial public offering; send the message to one or more networked nodes associated with one or more owners of the funding tokens; wherein the message comprises informing the one or more owners that a pro rata share of the raised funds is payable after the first initial public offering, that a portion of the proceeds of the first initial public offering is to be held back to fund a subsequent initial public offering for a second company and that a pro rata share of the raised funds is payable after the subsequent initial public offering; generate a smart contract accessible to the one or more networked nodes, wherein the smart contract comprises a payout triggering event; and a plurality of predetermined electronic actions for generating a smart contract output when the payout triggering event is met, wherein the smart contract generates a payout to the one or more owners automatically when the payout event is triggered, and record execution of the smart contract to the distributed ledger.

Embodiments of the system include the following, alone or in any combination.

A first payout event is completion of the first initial public offering. The payout may be a pro rata share of the funds raised by the first initial public offering.

A second payout event is completion of the subsequent initial public offering. The payout may be a pro rata share of the funds raised by the subsequent initial public offering.

The system further comprises one or more processors configured to execute the program instructions to cause the computing system to: receive, from a plurality of networked nodes, a plurality of bids for one or more funding tokens from a plurality of investors, determine, by a central processor, a fractional share of the funding tokens to allocate to each of the plurality of investors based on the respective bids associated with each investor; and allocate, by one or more processors, the fractional shares of the funding tokens to each of the plurality of investors.

The smart contract is between an issuer of the funding tokens and an investor in the funding tokens.

The second processor determines the subsequent initial public offering.

The first processor configured to determine a funding event is remote from the cascading funding platform.

The second processor configured to determine an initial public offering is remote from the cascading funding platform.

A second aspect provides for financing a first company and a second company comprising establishing an incubator financial firm configured to manage activities related to raising funds for the first company in a first initial public offering and raising funds for the second company in a subsequent initial public offering; defining an investor offering to raise funds from investors for the first and second companies against a pro rata share of the raised funds payable after the first initial public offering; holding back a portion of the proceeds of the first initial public offering to fund the subsequent initial public offering against a pro rata share of the raised funds payable after the subsequent initial public offering.

Embodiments of the method include the following, alone or in any combination.

Paying investors a pro rata share of the funds raised by the first initial public offering.

Paying investors a pro rata share of the funds raised by the subsequent initial public offering.

The method may further comprise defining an offering for sale of investment shares in the first company; receiving bids from investors for purchase of the investment shares; accepting the bids from investors; tracking revenue associated with the sale of the investment shares;

retaining a portion of revenue associated with the sale of the investment shares to fund an offering for sale of investment shares in a subsequent company; and paying parties a portion of the revenue from sale of investment shares in the subsequent company as it is received.

The method may further comprise establishing a special purpose vehicle company that holds all assets of the first company and/or establishing a special purpose vehicle company that holds all assets of the second company.

A portion of funds advanced by investors are returned to investors via a pass-through security based on revenues from sale of equity shares in the first initial public offering.

A portion of funds advanced by investors are returned to investors via a pass-through security based on revenues from sale of equity shares in the subsequent initial public offering.

Another aspect provides a distributed networked computer system for managing cascading funding of a first company and a second company, the distributed network computer system comprising a non-transitory computer readable storage medium having program instructions embodied therewith; and one or more processors configured to execute the program instructions to cause the computing system to receive, from a first networked node, a first bid for one or more shares of the first company from a first investor, wherein a portion of the revenue from sale of the first shares is used to fund activities related to funding the second company; determine, by a central processor, a fractional share of the first company and a fractional share of the second company to allocate to the first investor based on the first bid; allocate, by one or more processors, the fractional share of the first company and the second company to the first user; a distributed ledger for recording bids for the first company and respective allocated shares determined by the central processor, wherein the distributed ledger is accessible by the first networked node; and a smart contract accessible to the first networked node, wherein the smart contract comprises a first and second revenue payout triggering event, wherein the first revenue payout triggering event is completion of an initial public offering for the first company and the second revenue payout triggering event is completion of a subsequent initial public offering for the second company; and a plurality of predetermined electronic actions for generating a smart contract output when the first and second revenue stream payout triggering event are met, wherein the smart contract generates a payout to the first investor automatically when the payout event is triggered; and wherein the execution of the smart contract is recorded to the distributed ledger.

Embodiments of the distributed networked computer system include the following alone or in any combination.

A first payout is a pro rata share of the proceeds of the first initial public offering and a second payout is a pro rata share of the proceeds of the subsequent initial public offering.

The distributed network may further comprise one or more processors configured to execute the program instructions to cause the computing system to receive, from a plurality of networked nodes, a plurality of bids for one or more shares of the first company from a plurality of investors, determine, by a central processor, a fractional share of the one or more shares to allocate to each of the plurality of investors based on the respective bids associated with each investor; and allocate, by one or more processors, the fractional shares of the first company to each of the plurality of investors.

The plurality of smart contracts are accessible to the plurality of networked nodes, wherein each of the plurality of smart contracts comprises a first and second revenue payout triggering event, wherein the first revenue payout triggering event is completion of an initial public offering for the first company and the second revenue payout triggering event is completion of a subsequent initial public offering for the second company; and a plurality of predetermined electronic actions for generating a smart contract output when the first and second revenue stream payout triggering event are met, wherein the smart contract generates a payout to the first investor automatically when the payout event is triggered; and wherein the execution of the smart contract is recorded to the distributed ledger.

Further aspects may include a non-transitory computer readable storage medium comprising a plurality of computer readable instructions embodied thereon wherein the instructions, when executed by a distributed networked computer system for managing cascading funding of a first company and a second company, cause the distributed networked computer system to receive, from a first networked node, a first bid for one or more shares of the first company from a first investor, wherein a portion of the revenue from sale of the first shares is used to fund activities related to funding the second company; determine, by a central processor, a fractional share of the first company and a fractional share of the second company to allocate to the first investor based on the first bid; allocate, by one or more processors, the fractional share of the first company and the second company to the first user; a distributed ledger for recording bids for the first company and respective allocated shares determined by the central processor, wherein the distributed ledger is accessible by the first networked node; and a smart contract accessible to the first networked node, wherein the smart contract comprises a first and second revenue payout triggering event, wherein the first revenue payout triggering event is completion of an initial public offering for the first company and the second revenue payout triggering event is completion of a subsequent initial public offering for the second company; and a plurality of predetermined electronic actions for generating a smart contract output when the first and second revenue stream payout triggering event are met, wherein the smart contract generates a payout to the first investor automatically when the payout event is triggered; and wherein the execution of the smart contract is recorded to the distributed ledger.

Further aspects may also provide a method for managing cascading funding of a first company and a second company by a distributed networked computer system, the method comprising receiving, from a first networked node, a first bid for one or more shares of the first company from a first investor, wherein a portion of the revenue from sale of the first shares is used to fund activities related to funding the second company; determining, by a central processor, a fractional share of the first company and a fractional share of the second company to allocate to the first investor based on the first bid; allocating, by one or more processors, the fractional share of the first company and the second company to the first user; recording to a distributed ledger bids for the first company and respective allocated shares determined by the central processor, wherein the distributed ledger is accessible by the first networked node; and a smart contract accessible to the first networked node, wherein the smart contract comprises a first and second revenue payout triggering event, wherein the first revenue payout triggering event is completion of an initial public offering for the first company and the second revenue payout triggering event is completion of a subsequent initial public offering for the second company; and a plurality of predetermined electronic actions for generating a smart contract output when the first and second revenue stream payout triggering event are met, wherein the smart contract generates a payout to the first investor automatically when the payout event is triggered; and recording the execution of the smart contract to the distributed ledger.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION OF THE DISCLOSED SUBJECT MATTER

In accordance with various embodiments of the invention, and as shown in the figures, various systems and methods are disclosed which generally provide a platform for the creation, communication, price quotation, and execution of trades for specified pools of securities.

Figure 1A:
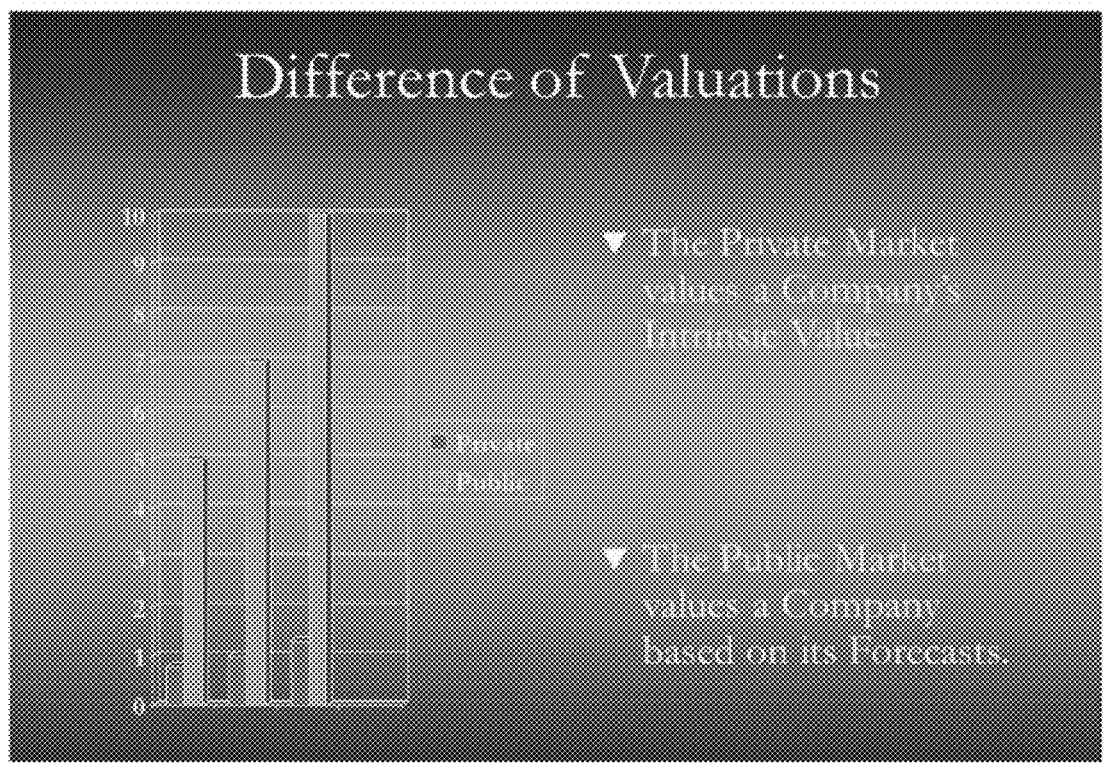
FIG. 1A depicts a schematic chart of the difference between private market valuation and public market valuation according to an exemplary embodiment of the disclosed subject matter.

The value creation of an IPO arises mainly from the difference of valuations between the private and public markets. The private market values the assets. In this valuation model, there is no anticipation and everything is based on the past, on the intrinsic value. For example as illustrated in FIG. 1A, a company that has a turnover of $1 million and a profit of $100,000 will be sold at approximately $1 million, less during a recession and more during a business boom. The public market values the anticipation. It is based on the equivalent interest rate. In a simplistic form, excluding risk factors, if the capital market interest rate is 2% and the company generates 10%, it will be valued by the public market at least five times its price. Thus, the company with a $1 million turnover would be sold at about $7 million, i.e. taking into account an anticipation on 15 years of turnover. The same company, with identical assets, may sell at about $5 million during recession with a 10 years anticipation, and perhaps $10 million if the market is booming with a 20 years anticipation.

Recent changes in U.S. laws have facilitated the ability of a startup to participate in an IPO to raise capital. The Jumpstart Our Business Startups (JOBS) Act is a piece of U.S. legislation that was signed into law on Apr. 5, 2012, that loosens regulations instituted by the Securities And Exchange Commission (SEC) on small businesses trying to raise investor funds. It lowers reporting and disclosure requirements for companies with less than $1 billion in revenue, and allows advertising of securities offerings. It greatly expands the number of companies that can offer stock without going through SEC registration.

The JOBS Act is meant to make it easier for startups to raise capital. Secondarily, it is meant to allow retail investors to invest in startups. The JOBS Act established the category of "emerging growth companies," which the SEC defines as a company that is issuing stock with total annual gross revenues of less than $1 billion during its most recently completed fiscal year. The JOBS Act lessens reporting and oversight requirements for these companies. Before the JOBS Act, in most cases, only accredited investors could invest in startups.

It greatly expanded a category under a rule called "Regulation A" (or Reg A), which allows companies to offer stock without going through the process of registering with the SEC. Under the JOBS Act, the expanded Reg A, often called Reg A+, allows companies to offer up to $50 million in stock each year without needing to meet normal registration requirements. Retail investors can invest up to certain amounts, allowing them access to relatively risky capital investments.

Despite these improvements, barriers to a successful IPO remain. For example, all costs included for an IPO represent an average of 20% of the amount raised up to 35% for a startup raising a very large amount of capital These costs can seem high, but one needs to consider the size of the risk, especially when the company has no operating history.

In addition to significant cost, an IPO monopolizes a significant portion of the company's resources and the management's attention. It is also very hard to define a timeline for preparation of an IPO. Reporting requirements for an entity increase the older the entity is. New startups can require an indefinite amount of additional time to create non-existent documents that are essential to the process. An IPO process usually lasts less than a year provided that there is no preliminary private equity or mezzanine investment required and that the issuer can afford the IPO costs. A fast IPO process usually lasts less than six months. These timelines do not include delays by the issuer or by authorities to provide information, documents, decisions, financial statements, third-parties opinions such as experts or lawyers that are needed in the process. That is why it is not uncommon that during the capitalization (e.g. IPO) process, the performance of the company is heavily impacted. Hence, there may be an additional need for funding, if only to offset the poor sales performance due to the effort of the capitalization or IPO process.

Conventionally, funding for a small company such as a start-up company is independent from funding for all other small companies. That means that each company requires a stand-alone funding regime, wherein the capitalization process is repeated individually each time a company seeks funding. As discussed above, the funding efforts can significantly disrupt other activities related to a business and the specialized resources needed for the funding efforts are beyond the reach of many small companies without outside help.

An unconventional method for funding small companies using cascading funding is described herein. Cascading funding links funding for a first company to funding for a second company, such that the funding of the funding of the first company can be used to temporarily support activities relating to funding the second company. For example, if a portion of the valuation differential between the private market and the public market can be captured temporarily during an IPO, it could be used to finance one or more subsequent IPOs. It is appropriate to differentiate, in the total cost of an IPO or other capitalization, the costs that must be borne by the future company issuing shares before trading the IPO process, called "Upfront" or "Pre-Cash" (fees of lawyers, etc.), from those which will be supported at the end of the IPO by the raised funds, "Post-Cash" (commissions of Brokers or Investment Banks, etc.). It is also appropriate to "make whole" the portion of the valuation differential from a first IPO that is to be used for subsequent IPO's.

Figure 1B:
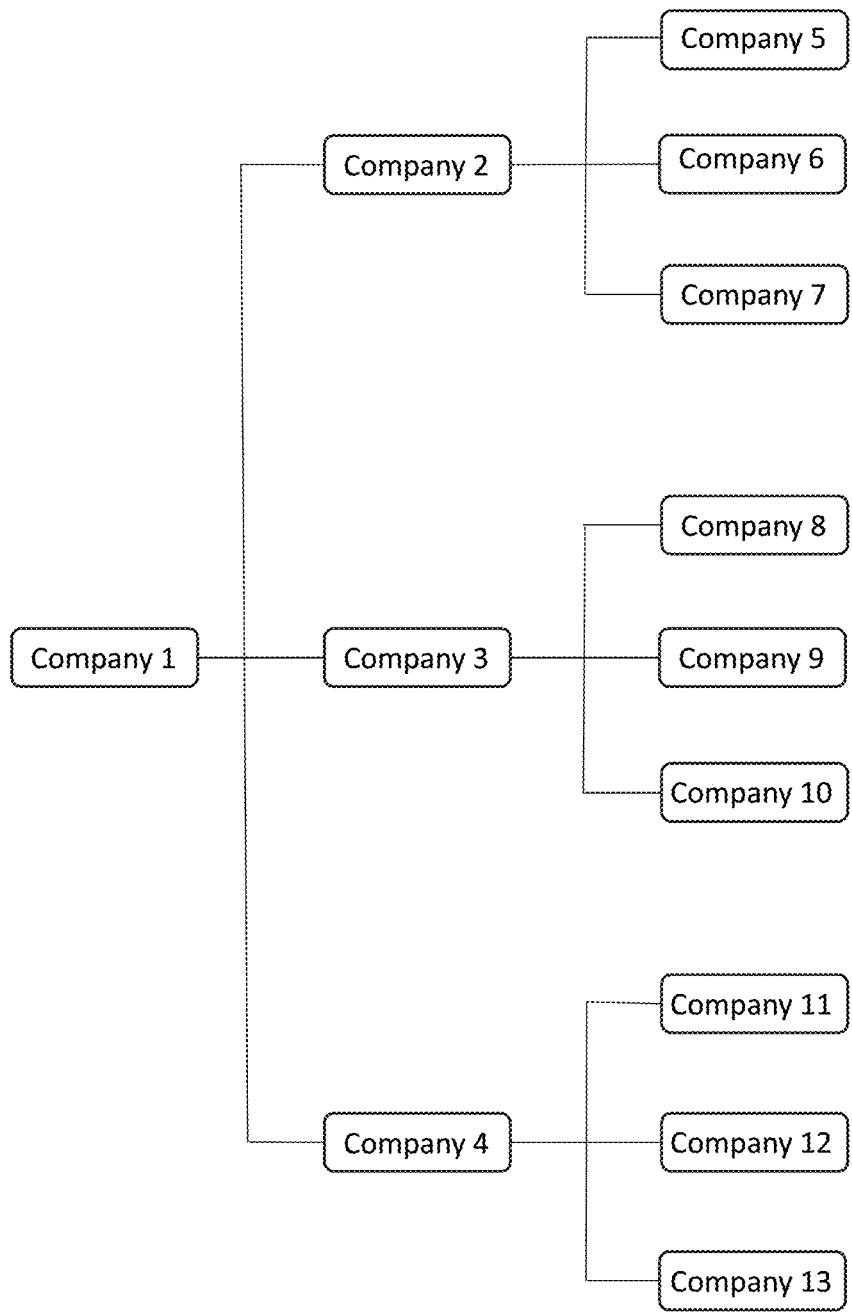
FIG. 1B depicts a schematic chart of cascading IPO incubators according to an exemplary embodiment of the disclosed subject matter.

For example as shown in FIG. 1B, a company, Company 1, can be established to raise funds in an IPO. A portion of the funds raised in the IPO for company 1 can be used to establish Companies 2, 3 and 4. For example, Company 1 may be established as a Reg A+ company and may issue up to $50 million of shares per year. The funds from the sale of the shares can be used to finance an initial IPO. A portion of the proceeds of the initial IPO can be used to establish one or more subsequent Reg A+ companies (Companies 2, 3, and 4), each of which can issue up to $50 million of shares in its first year and manage subsequent IPOs. Companies 2, 3 and 4 can in turn, spawn a third tier of Reg A+ companies (Companies 5 through 13). Provided that its revenues are less than $1 billion per year and its age allows it to remain a Reg A+ company, Company 1 can issue another round of shares up to $50 million in the next year. As the first or subsequent IPOs are capitalized by new investors, shareholders of the Companies are reimbursed for providing the pre-IPO costs. The entity seeking funding during the IPO does not bear any costs during the IPO process, and the portion of the valuation differential captured for subsequent IPO's is accounted as an advance from the Company and deducted from the proceeds of the sale equity shares in the entity. Although this is described for the maximum allowance of share issued per year per company, this model can be used for S-1 (Traditional IPO), F-1 (Traditional IPO of a Foreign issuer), Reg-A or Reg A+ filings, or any combination of filing types for companies 1 through 13.

Preferably, Company 1 comprises a core team of experts in managing and executing IPOs, including legal teams, valuation teams, financial team and management teams. The experts in Company 1 may also provide their expertise as a service function to Companies 2 through 13 to manage their IPO's. The companies shown schematically in FIG. 1B can be considered as fundraising Incubators.

An equity securities issuer ("Issuer") that cannot finance its IPO costs but wants to go forward with an IPO will sign an agreement with either an IPO incubator or an IPO Sponsor or an IPO Investor or Transaction Funder ("Investor") and have the expenses of its IPO paid directly by said Investor to Issuer's suppliers (lawyers, accountants, auditors, financial public relations etc.) up to a specified amount, in example USD 10 million. To use the proceeds of said IPO, this credit limit may be doubled, so USD 20 million will be added to the amount, disclosed in the S-1, F-1 or Reg-A+ or any other prospectus and paid to the investor upon success of the IPO. Referring to FIG. 1B, Company 1 may be an Incubator company that is set up to organize an IPO for a first company. The extra credit limit in the prospectus can be used to fund an IPO for a second company, Company 2, which cannot finance its IPO costs. The costs of the IPO for Company 2 borrowed from the investors in Company 1 can be reimbursed to the investors in Company 1 after the IPO for Company 2. As discussed further below, investors in Company 1 can be reimbursed for funding the IPO for Company 2 in several ways, such as by a pass-through security payable after the IPO for Company 2 or by an equity position in Company 2.

As used herein, a fundraising Incubator is a company financing corporate transactions such as an initial public offering (IPO) against an equity participation and a put option on this equity participation to the issuer itself. The put option, issued by the same issuer as the equity participation, ensures the investor that, in case of success of the transaction, the investor can resell this participation to the issuer immediately after.

The function of the Incubator is to manage aspects of the capitalization process, while the management and structure of the entity seeking funding can continue to manage aspects related to its normal corporate and entrepreneurial functions including development, production and sale of commercial products to consumers. Because the Incubator is capitalized, organized and configured specifically for funding and managing an IPO, it removes the key barriers to a startup seeking an IPO, those of cost and expertise.

In some embodiments, separation of the entity's normal functions from aspects related to the capitalization is accomplished by formation of a special purpose vehicle. As used herein, a special purpose vehicle (SPV) company is an industrial and commercial company that holds all assets of the company or group seeking IPO financing consolidated together. Assets held by the SPV are related to the commercial offerings of the company or group and include for example, intellectual property and know-how, tangible assets including infrastructure, equipment, goods for manufacturing product(s), inventory of product(s) for sale etc., and human assets including employees in technical, marketing, sales etc., and management personnel. Although this is not an absolute obligation, it is desirable for the future SPV issuer to remain financially, commercially and in every sense of the word credible in front of the financial market. This aspect should be studied case by case as part of the definition of the IPO or other offering. In some embodiments, when a known group or entity has a subsidiary bearing all or part of its name, for example; BOUYGUES Telecom or PEUGEOT Leasing, the SPV may hold assets from the subsidiary while not holding assets within a parent entity outside of the subsidiary.

Figure 1C:
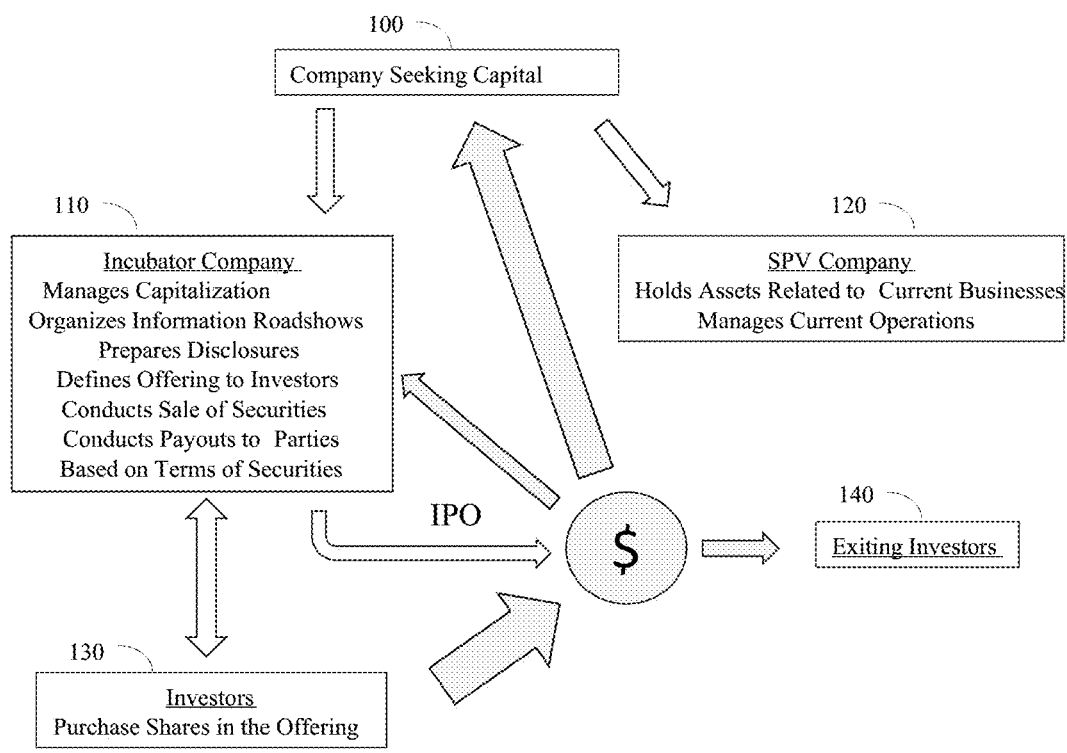
FIG. 1C depicts a schematic chart of incubator and SPV firms related to a capitalization according to an exemplary embodiment of the disclosed subject matter.

As illustrated in FIG. 1C, an entity or company 100 seeking capital funding may set up or engage an Incubator company 110 to manage aspects of the capitalization, including organizing information roadshows to exchange information with potential investors, prepare disclosures, define offerings to investors, conduct sale of securities, and manage financials, including receiving payments for securities from investors 130 and distributing payouts to parties including company 100 and investors wishing to exit the securities 140. The incubator company 110 retains a portion of the income from the sale as payment for its activities. A special purpose vehicle (SPV) company 120 is also set up to hold tangible and intangible assets related to current businesses and manage current operations. Company 100 retains control of the SPV company 120 through the financing process, such as by retaining a portion of shares in the SPV while the remainder of the shares in the SPV are sold to investors. The goal of these activities is an initial public offering. After the capitalization in the IPO is complete, the Incubator company 110 is dissolved or otherwise severed from company 100.

As described above, a portion of the proceeds of the sale of the IPO securities is used to fund the pre-IPO costs. Investors providing the pre-IPO costs are compensated by a portion of the funds raised during the IPO share sales. Funding of the IPO costs may be obtained by selling a series of tranches of securities related to IPO creation and sales. The first tranche may be sales of shares in the Incubator company itself, which may occur prior to or during the matching of an Incubator with an entity seeking an IPO. The second tranche may be after the entity seeking funding is identified and the tranche comprises shares in the SPV established during the IPO process targeted toward market leaders to provide initial funding to the company and assure market followers that the company will be successful. A third tranche may comprise a pass-through security wherein the investor receives a portion of the proceeds of the sale of equity shares during the IPO. A fourth tranche may comprise a pass-through security wherein the investor receives a portion of the proceeds of the sale of equity shares during a subsequent IPO organized by the Incubator. A pass-through security is a debt obligation that represents the cash flows towards a certain asset or liability. It simply passes future cash flows onto an investor. A final tranche comprises sale of equity shares in the SPV targeted toward market followers and retail investors. Each tranche provides a means of exit for investors who want exit the company. When a new tranche is sold, the investors who invested in a previous tranche that want or need to exit can sell some or all of their securities to new investors.

The process of organizing an IPO, or other capitalization vehicle comprises the following steps.

An IPO Incubator Company, or "Incubator" is incorporated, for example in the State of Delaware in the United States of America. It can be a traditional financial company that, depending on its structure, may or may not be required to register with the Securities and Exchange Commission (SEC) as a subject of the 1940 Investment Company Act.

A special vehicle ("SPV") company is incorporated, such as in Delaware, USA. It is an industrial and commercial company wherein all assets of the company or group seeking IPO financing are consolidated together. It could be seen as a holding company; however, it is desirable to treat the SPV as a fully operational entity and not a holding company, which can result in a significant devaluation when a listed company is perceived by the market as a "Holding".

The Incubator's legal team prepares a "Regulation A+" disclosure document for the Incubator. Since this document is very similar from one time to another, the cost of this operation should decrease significantly over time as the Incubator organizes more financing vehicles. This disclosure document states to the investor that Incubator is an investment company that finances IPOs of any size, against a share of the capital prior to the IPO and a pro rata share of the raised funds payable after the IPO.

The Regulation A+ document offers the investor three ways out of investment:

The investor can sell Incubator shares at the time of the IPO; or

The investor can convert Incubator actions into SPV actions after the Incubator IPO and before the start of the SPV IPO process; or Incubator buys back the investor's shares after (its) Incubator IPO.

Incubator files with the Securities and Exchange Commission (SEC) for registration and listing on a (US) stock market such as the NASDAQ or New York Stock Exchange.

The SEC reviews the file and sends its comments, questions and possible objections to Incubator.

Meanwhile, the Incubator and the investment bank or investment bank syndicate that distributes the Incubator's shares are holding roadshows to promote the stock on the market and to collect Incubator's share "orders". During this period, legally, each market player is not allowed to buy the shares, but can only express interest and quantify the amount s/he is willing to invest. In practical terms, a buyer who expresses an interest in a quantity of shares and then withdraws would lose any credibility on the market and would be unable to continue trading in other IPOs.

A Roadshow is a presentation organized by an issuer of securities and the syndicate of brokers and investment banks underwriting an issue of securities, aiming at presenting to investors an opportunity of investment.

It may take place in a hotel, a convention center, a bank or other prestigious place under various circumstances such as a Private Offering of equity or debt securities, an Initial Public Offering (IPO), a Secondary Public Offering or a Non Deal Presentation. In other embodiments, the roadshow may be virtual, presented via electronic media such as via the Internet or a limited access network (e.g. in a webcast). During the roadshow, the management of a company issuing securities or doing an Initial Public Offering (IPO) gives presentations to analysts, fund managers, potential investors and their financial advisors.

The roadshow is intended to generate excitement and interest in the issue or IPO, and is often critical to the success of the offering. The roadshow may move across many locations that are scheduled in advance and completed over a specific time period to inform and engage multiple potential investors. Roadshows may be sometimes be limited to one country but usually include several international stops. Within the United States, some common destinations include New York City, Chicago, Los Angeles, Miami and Denver.

Roadshow events may attract hundreds of prospective buyers interested in learning more about the offering. The events may include multimedia presentations and question-and-answer sessions with several of the company's officers present. Many companies take advantage of the internet and post versions of road show presentations online. In addition to the larger road show events, companies may also hold smaller, private meetings in the months and weeks preceding the offering.

Roadshows cover a variety of topics including the company's history and future plans for growth. Information about the company's current assets, whether tangible or intangible, can be presented, as well as a sales pitch regarding the upcoming offering.

Aside from providing information regarding the offering, the roadshow allows the company the opportunity to answer questions that may be posed by skeptics in the marketplace or during due diligence meetings. It provides a forum where the company can communicate directly with potential stakeholders to address any potential concerns.

The underwriters also use information gathered from investors to complete the book-building process, which involves gathering prices potential investors are willing to pay for the offering.

Once the road show activity is completed, the final prospectus is created and distributed to potential investors. This prospectus is also filed with the U.S. Securities and Exchange Commission (SEC).

An initial price for the offering is set based on the information gathered during the book-building process, and the IPO date is solidified.

A non-deal roadshow occurs when executives hold discussions with current and potential investors but nothing is offered for sale. A roadshow provides an introduction of the offering to potential investors and was considered a key non-financial factor in buying decisions made by 82% of institutional investors in regards to IPOs in a 2014 study by Ernst & Young.

At the end of this process iteratively, the SEC gives the Incubator's legal team the quotation authorization.

Incubator can therefore register with a US stock market, such as the NASDAQ. In the rare case of multiple listings, Incubator may also register with foreign stock exchanges.

Incubator launches the IPO.

Once the funds are raised, in accordance with the use of the product stipulated by the Regulation A+ Disclosure Document, Incubator makes at least the following payments:

A payment to the investment bank's account to pay the brokerage commission if it has not been deducted before the funds were sent to Incubator.

A payment to the SPV account to secure SPV funding.

Payment of SPV's IPO fees and expenses to the lawyers' account.

The payment of a success bonus on the account of the lawyers according to the prescribed procedures.

The payment to the financier of the Incubator IPO.

SPV receives from Incubator the budget necessary to carry out its IPO.

SPV's legal team drafts a "Regulation 5-1" disclosure document for the SPV.

SPV's legal team prepares the SPV registration file with the SEC in Form S-1 and the due diligence file. This is much longer than the Regulation A+ form prepared for Incubator. It should be noted that the Regulation A+ form is a short form because it seeks a partial exemption from registration, while the S-1 form is a complete record including all significant transactions carried out by the issuer in the last five or ten years, according to the case. The issuer cannot begin this full registration process until it has two full accounting years and a number of financial conditions completed.

This document offers the investor three ways out of investment:

The Investor sells SPV shares at the time of the IPO; or

The SPV buys back the Investor's shares after Incubator's IPO; or

Finally, the Investor does not wish to leave and remains a shareholder of the SPV.

SPV files its prospectus with the SEC in order to be able to register there and obtain the listing of its shares on a US stock market.

The SEC reviews the SPV's file and sends its comments, questions and possible objections to SPV.

Meanwhile, SPV and the investment bank or investment bank syndicate that distributes its shares organize roadshows to promote the security on the market and to collect SPV's "orders" for shares. During this period, legally, each market player is not allowed to buy the shares, but can only express interest and quantify the amount s/he is willing to invest. In practical terms, a buyer who expresses an interest in a quantity of shares and then withdraws would lose any credibility on the market and would be unable to continue trading other IPOs.

Figure 2A:
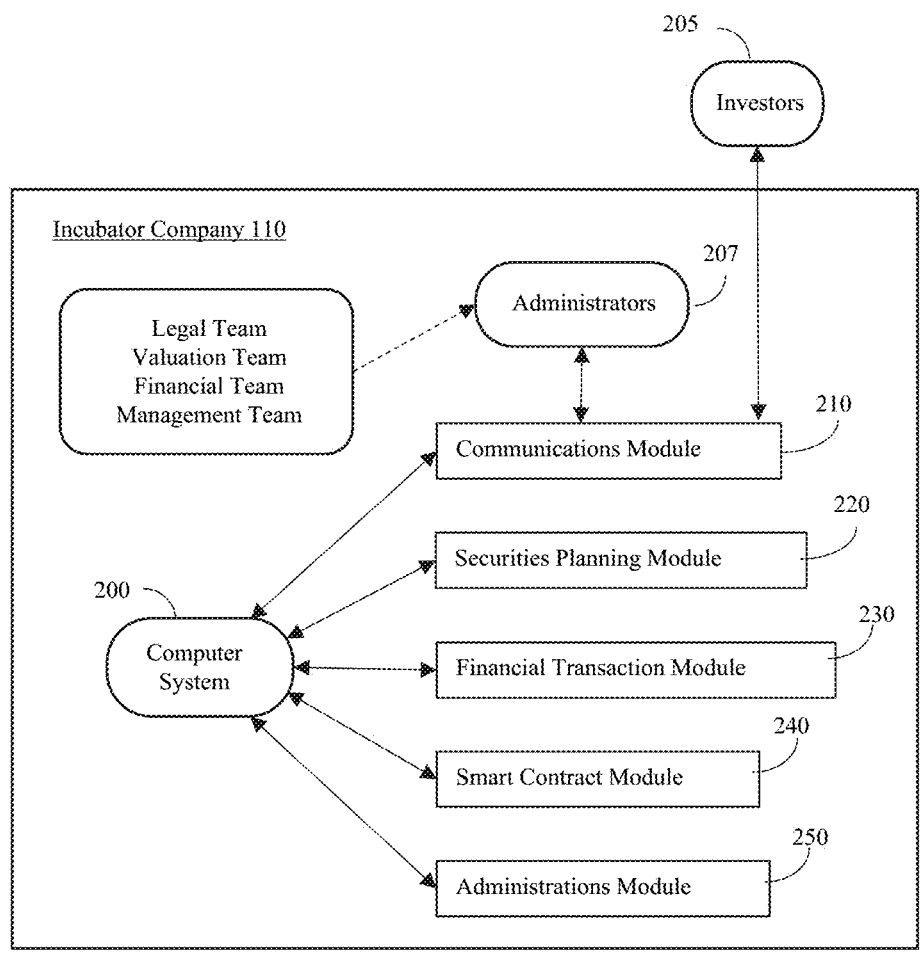
FIGS. 2A and 2B depict schematic functional diagrams of a computer system relating to planning and developing securities, modeling and evaluating alternatives, as well as executing and administering an offering for sale of securities according to an exemplary embodiment of the disclosed subject matter.

As shown in FIG. 2A, a computer system 200 is the core element of the securities architecture within the incubator company 110, receiving, generating, storing, integrating and coordinating data required for defining the securities, receiving investment payments from a plurality of investors 205, optionally generating smart contracts among investors and the company, determining revenues related to the securities and administering payouts to parties. The computer system is further provided with at least one processor and into which is loaded software components for receiving informational inputs from the plurality of potential investors via communications module or interface 210.

Block 210 represents a communication module, which manages inputs from investors and transmits outputs to the investors. Inputs from investors include investing information, investor interest in the potential offering, investor identity, designation of a payment vehicle or digital "wallet", such as a bank account, credit or debit account, including credit or debit cards issued by a financial institution, Venmo or Pay Pal® apps, etc. Communications module 210 may also be used by administrator(s) 207 within the incubator company 110 of the computer system to communicate with the system. Administrator(s) include representatives of the legal, valuation, financial and management teams charged with organizing and executing the IPO. Administrator(s) may provide inputs to the system to maintain and manage the system to make sure it is operating correctly. In embodiments, the administrator(s) 207 may also provide information from the sellers (e.g. company 100), brokers, investment banks, underwriters, etc., risks assessments, projected revenue streams, etc.

Figure 2B:
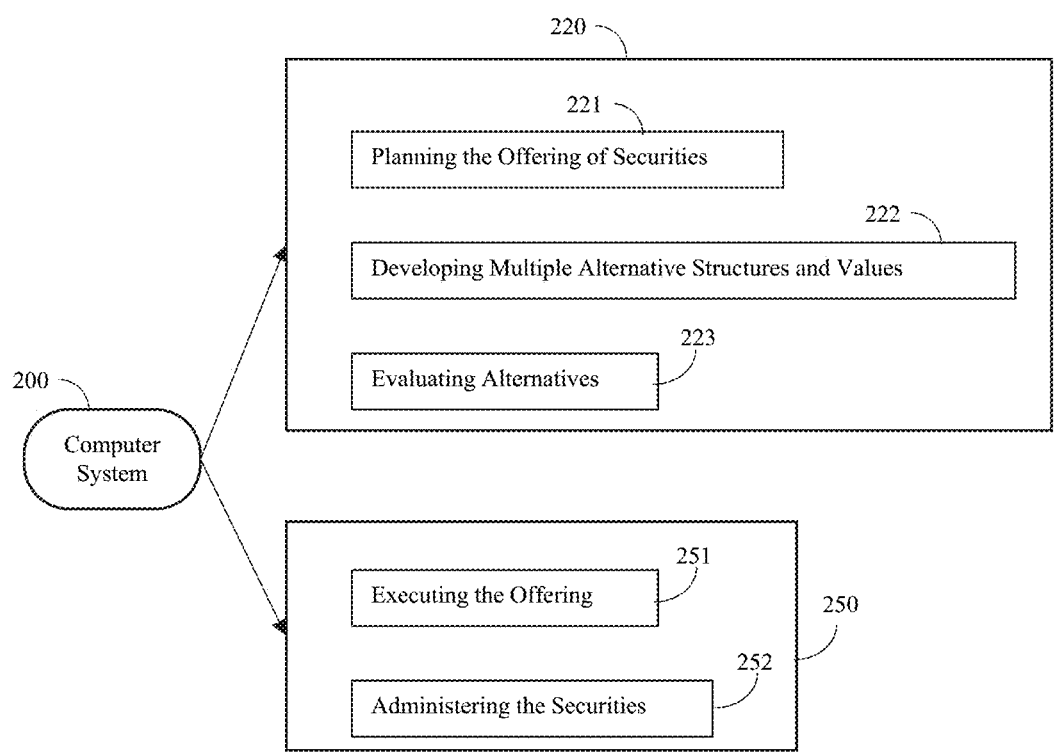

In block 220, the system includes a securities planning module in which the securities are defined, as described in greater detail in regard to FIG. 2B.

Block 230 comprises the financial transactions module that manages payments from investors to cover their bids, payments to parties and collection of transaction fees. In embodiments, once a bid is accepted, the financial transactions module may withdraw the bid amounts plus transaction fees from investors' payment vehicles in response to acceptance of bids by the computer system. Block 230 also disburses payments to the parties based on the terms of the securities.

In embodiments, the securities may be offered in the form of a smart contract, described in greater detail below. In block 240, the smart contract module executes smart contracts by generating data blocks defining the securities, including all terms and conditions binding on the investors and the company such as purchase prices, percentages of the assets represented by the securities, etc.

Block 250 shows the securities administration module, which executes and administers the securities.

As shown in FIG. 2B, block 220 comprises aspects of defining the security offerings.

In block 221, planning the offering of securities includes establishing the target amount of capital to be raised. Guided by inputs from administrator(s) of the system representing the seller, bank, broker, underwriter and/or other financial institutions, the system conducts feasibility studies for offering securities to define the structure of the offering. Inputs may also include information from potential investor gathered in roadshows, etc. The offering planning includes specific variables to be included, ranges of acceptable values for each variable, and terms and conditions to be included in the offering.

In block 222, the system models and projects multiple values of individual variables and combinations of multiple sets of variables, such as time series projections and economic modeling of interaction between variables.

In block 223, the system evaluates alternatives by reviewing results of modeling and projections. Selecting one or more sets of variables that meet targets will be used to refine the structure and value of variables and terms and conditions for price categories of the shares. Additional modeling and projections may be required to define a preferred set of values for the variables and terms and conditions for inclusion in the offering of securities in the price categories of the shares.

FIG. 2B also shows block 250 comprising aspects of administering the security offerings.

In block 251, the system executes the offering of the securities. The price and content of the individual securities are established. Technical and legal details are finalized, required disclosures are prepared, and the securities are brought to market. The system receives and accepts bids for shares in the security from at least one investor, tracks progress of sales of shares in the security, and closes sales when target values are met. The system may also receive sell orders from holders of securities and sell them to new investors.

Block 251 may comprise an order creation module. In general, the order creation module may have two modes of functionality. In a first mode, the order creation module permits an investor to express interest in pre-offering activities and provide that information to the securities. In a second mode, the order creation module receives and processes bids from investors after the offering is listed.

In block 252, the system administers the securities (shares) in the offering. It maintains detailed and current records of individual investor accounts as required for periodic and cumulative payments, tax treatment, benefits, reports and other purposes. It maintains required and useful records related to financial analysis and financial reports of investors, brokers, and other involved parties.

In embodiments, the offering, sale and administration of the securities may be conducted as a smart contract.

A smart contract is a computer application simulating the operation of a contract. It is a computer program or a transaction protocol which is intended to automatically execute, control or document legally relevant events and actions according to the terms of a contract or an agreement between or among parties. The objectives of smart contracts are the reduction of need in trusted intermediators, arbitrations and enforcement costs, fraud losses, as well as the reduction of malicious and accidental exceptions. The smart contract is stored on distributed ledger such as a blockchain that runs when predetermined conditions are met. Distributed ledger technology (DLT) is a digital system for recording the transaction of assets in which the transactions and their details are recorded in multiple places at the same time. Unlike traditional databases, distributed ledgers have no central data store or administration functionality. They may be used to automate the execution of an agreement so that all participants can be immediately certain of the outcome, without any intermediary's involvement or time loss.

The reliability of the smart contract comes from its automaticity which gives it a power of execution unmatched to date.

A smart contract also can be regarded as a secured stored procedure as its execution and codified effects like the transfer of some value between parties are strictly enforced and cannot be manipulated, after a transaction with specific contract details is stored into a blockchain or distributed ledger. That is because the actual execution of contracts is controlled and audited by the platform, not by any arbitrary server-side programs connecting to the platform. Smart contracts are particularly useful for managing exchanges of virtual financial or value assets, where no tangible materials need to be moved.

Blockchain is a distributed ledger technology that enables a set of peers to work together to create a unified, decentralized network. The peers can communicate and share information or data with the help of a consensus algorithm. There is no need for a centralized authority, which makes the whole network trustworthy when compared to other networks. When one peer sends information to another, a transaction is generated in the form of a "block". Blocks are used to store transactions and other important information that is required to operate the blockchain successfully. When this happens, the transactions need to be validated using the consensus algorithm. Proof of Work is used to validate the work. It ensures that no invalid transactions are passed into the blockchain. Timestamps are created to ensure that each transaction can be traced, backed, and verified by anyone. The blockchain provides transparency, immutability, and security.

The smart contract preferably is structured to adhere to the basic rules of prudence in a transaction financing investment including the following:

Having a commitment from both parties to the transaction provides the safest conditions to the investment. Commonly, a transaction financing agreement is entered into between one party to the transaction and the representative of the investors.

Reduce the time of the investment to the minimum. This rather simple rule has lots of implications, from logistics to legal conditions. Representatives of the investors, who are desirably financiers or businessmen but not attorneys-at-law, can pool investor funds into an account under the representatives' control and verify the parties' consents and willingness to proceed.

Have all the transaction (key) terms agreed upon before the financing takes place. The investor or his representative must ascertain that the parties are in full agreement on all (key) terms of the transaction. While the parties might not be able to bear the cost of all agreements drafting before the transaction financing takes place, they can surely produce a complete term sheet for each agreement needed for the transaction. Any party receiving the transaction financing can also take the commitment toward the investor that no other additional or new (key) term shall be required from the other party after the financing takes place, preventing thereby the classic last minute requirement that makes the transaction fail.

The contracting parties program the contractual terms, payments to be made and all dispatches of documents used for the execution of the contract in the software application and may no longer retract their commitments. Once launched, the application performs the scheduled operations without human intervention, as scheduled.

End clients interact with a smart contract through transactions. Such transactions with a smart contract can invoke other smart contracts. These transactions might result in changing the state and sending financial assets from one smart contract to another or from one account to another. Financial assets can include nationally denominated currencies, cryptocurrencies, virtual stock certificates, or other assets whose value can be defined digitally.

Similar to a transfer of value on a blockchain, deployment of a smart contract on a blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms secure the smart contract in a decentralized way from attempts to tamper with it. Once a smart contract is deployed, it cannot be updated. Smart contracts on a blockchain can store arbitrary state and execute arbitrary computations.

The reliability of the intelligent contract can be greatly increased by relying on a decentralized IT environment allowing secure access to the contractors and unfalsifiable by them.

Each smart contract may include information about the investment in the security. Such information may include the amount of the investment, the agreed-upon payouts, the revenue stream, the time the investment is agreed upon, the identities of the parties, etc. Investment information may further include conditional outcomes based upon each potential outcome, including the facilitation of payment from the investor to the seller, and/or the return of funds in event of a void or cancellation. In some embodiments, a settlement service may be agreed upon between the parties.

Some embodiments provide that the smart contracts may be generated on individual PC's, on a mobile device and/or in the cloud. Such examples are non-limiting as the smart contracts may be generated at a variety of other devices and/or types thereof. In some embodiments, each smart contract may involve external services at the discretion of the parties. In some embodiments, a range of options may be selected by the parties at the time the smart contract is generated.

Some embodiments provide that a smart contract may be registered with a settlement service provider that is agreed to by the parties. In some embodiments, a settlement service may provide information about the outcome of the assets on which the security is based. In some embodiments, the settlement service may send the information to the counterparties, which may trigger the payouts under the terms of the smart contract. For example, the settlement service provider may initiate a bank transfer from the buyer to the seller based on the smart contract. In some embodiments, the process may be automated by software on a computer and/or server controlled by the settlement service. Embodiments herein do not require the funds to be held in any kind of escrow, however, such option is contemplated by this disclosure. For example, embodiments herein are directed to any financial settlement process that may be used in conjunction with the smart contracts as disclosed herein.

Some embodiments provide that the settlement transaction may be stored in blockchain to close the contract. In some embodiments, details corresponding to the settlement transaction may be retained for auditing, later scrutiny and/or to ensure that no errors are made.

Figure 3:
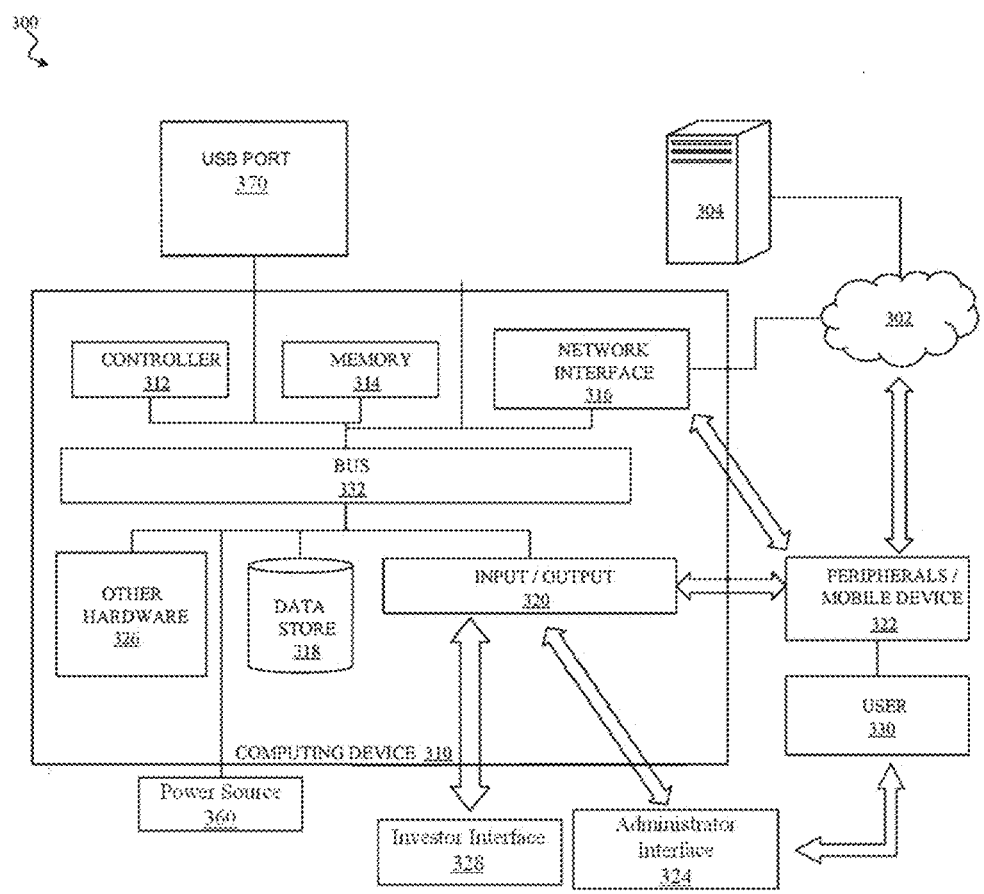
FIG. 3 depicts a functional diagram of components of a computer system according to an exemplary embodiment of the disclosed subject matter.

FIG. 3 depicts a computer system 300 according to an embodiment of the present disclosure. In general, the computer system 300 may include a computing device 310, such as a special-purpose computer designed and implemented for receiving user inputs, determining and directing and controlling the output of signals. The computing device 310 may be or include data sources, client devices, and so forth. In certain aspects, the computing device 310 may be implemented using hardware or a combination of software and hardware. The computing device 310 may be a standalone device, a device integrated into another entity or device, a platform distributed across multiple entities, or a virtualized device executing in a virtualization environment.

The computing device 310 may communicate across a network 302. The network 302 may include any data network(s) or internetwork(s) suitable for communicating data and control information among participants in the computer system 300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 300. The network 302 may also include a combination of data networks and need not be limited to a strictly public or private network.

The computing device 310 may communicate with an external device 304. The external device 304 may be any computer, mobile device such as a cell phone, tablet, smart watch or other remote resource that connects to the computing device 310 through the network 302. This may include any of the servers or data sources described herein, including servers, content providers, databases or other sources for shot information to be used by the devices as described herein.

In general, the computing device 310 may include a controller or processor 312, a memory 314, a network interface 316, a data store 318, and one or more input/output interfaces 320. The computing device 310 may further include or be in communication with peripherals 322 and other external input/output devices that might connect to the input/output interfaces 320.

The controller 312 may be implemented in software, hardware or a combination of software and hardware. According to one aspect, the controller 312 may be implemented in application software running on a computer platform. Alternatively, the controller 312 may include a processor or other processing circuitry capable of processing instructions for execution within the computing device 310 or computer system 300. The controller 312, as hardware, may include a single-threaded processor, a multi-threaded processor, a multi-core processor and so forth. The controller 312 may be capable of processing instructions stored in the memory 314 or the data store 318.

The memory 314 may store information within the computing device 310. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user 330. The memory 314 may include a number of different stages and types of memory for different aspects of operation of the computing device 310. For example, a processor may include on-board memory and/or cache for faster access to certain data or instructions, and a separate, main memory or the like may be included to expand memory capacity as desired. All such memory types may be a part of the memory 314 as contemplated herein.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310.

The network interface 316 may include any hardware and/or software for connecting the computing device 310 in a communicating relationship with other resources through the network 302. This may include remote resources accessible through the Internet, as well as local resources available using short range communications protocols using, e.g., physical connections (e.g., Ethernet), radio frequency communications (e.g., Wi-Fi, Bluetooth), optical communications (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver for receiving AM/FM or satellite radio sources, a near field communications interface, a radio-frequency identification (RFID) tag reader, or any other data reading or writing resource or the like.

The network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal or external memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for relatively long-term, persistent storage and subsequent retrieval and use. For example, the data store 318 may store an operating system, application programs, program data, databases, files, and other program modules or other software objects and the like.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

The input/output interface 320 may support input from and output to other devices that might couple to the computing device 310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 316 for network communications is described separately from the input/output interface 320 for local device communications, these two interfaces may be the same, or may share functionality, such as where a USB port 370 is used to attach to a Wi-Fi accessory, or where an Ethernet connection is used to couple to a local network attached storage. The input/output interface 320 may further output signals to displays of peripheral devices, as described herein.

As used herein, a user 330 is any human that interacts with the computer system 300. In this context, a user may be generally classed within one of two categories. One category is an administrator of the system, representing the seller and/or financial institution organizing and conducting the offering of the security. Another category is an investor who buys and sells shares in the security.

In certain embodiments the I/O interface 320 facilitates communication with input and output devices for interacting with a user. For example, the I/O interface may communicate with one or more devices such as a user-input device and/or a display 350 which may be instantiated on the device described herein or on a separate device such as a mobile device 208, which enable a user to interact directly with the controller 312 via bus 332. The user-input device may comprise one or more push-buttons, a touch screen, or other devices that allows a user to input information. In these embodiments, the computer system may further comprise a display to provide visual output to the user. The display may comprise any of a variety of visual displays, such as a viewable screen, a set of viewable symbols or numbers, and so on. One can appreciate that the inputs and outputs of the computer system would be different for administrators and investors. Accordingly, the computing device 310 may communicate with administrators and investors with different interfaces 324 and 328.

A peripheral 322 may include any device used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a printer, a projector, a headset or any other audiovisual device for presenting information to a user. The peripheral 322 may also or instead include a digital signal processing device, an actuator, or other device to support control of or communication with other devices or components. In one aspect, the peripheral 322 may serve as the network interface 316, such as with a USB device configured to provide communications via short range (e.g., Bluetooth, Wi-Fi, Infrared, RF, or the like) or long range (e.g., cellular data or WiMax) communications protocols. In another aspect, the peripheral 322 may augment operation of the computing device 310 with additional functions or features, or other device. In another aspect, the peripheral 322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, a camera, a microphone, additional speakers, and so forth. The other hardware 326 may also or instead include expanded input/output ports, extra memory, additional drives, and so forth.

A bus 332 or combination of busses may serve as an electromechanical backbone for interconnecting components of the computing device 310 such as the controller 312, memory 314, network interface 316, other hardware 326, data store 318, and input/output interface. As shown in the figure, each of the components of the computing device 310 may be interconnected using a system bus 332 in a communicating relationship for sharing controls, commands, data, power, and so forth.

The computing device 310 is connected to a power source 360 to provide electrical power for the computing device to run.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

The computer program controls input and operation of the device. The computer program includes at least one code segment stored in or on a computer-readable medium residing on or accessible by the device for instructing the computing elements, and any other related components to operate in the manner described herein. The computer program is preferably stored within the memory and comprises an ordered listing of executable instructions for implementing logical functions in the device. However, the computer program may comprise programs and methods for implementing functions in the device that are not an ordered listing, such as hard-wired electronic components, programmable logic such as field-programmable gate arrays (FPGAs), application specific integrated circuits, or other similar or conventional methods for controlling the operation of electrical or other computing devices.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 4:
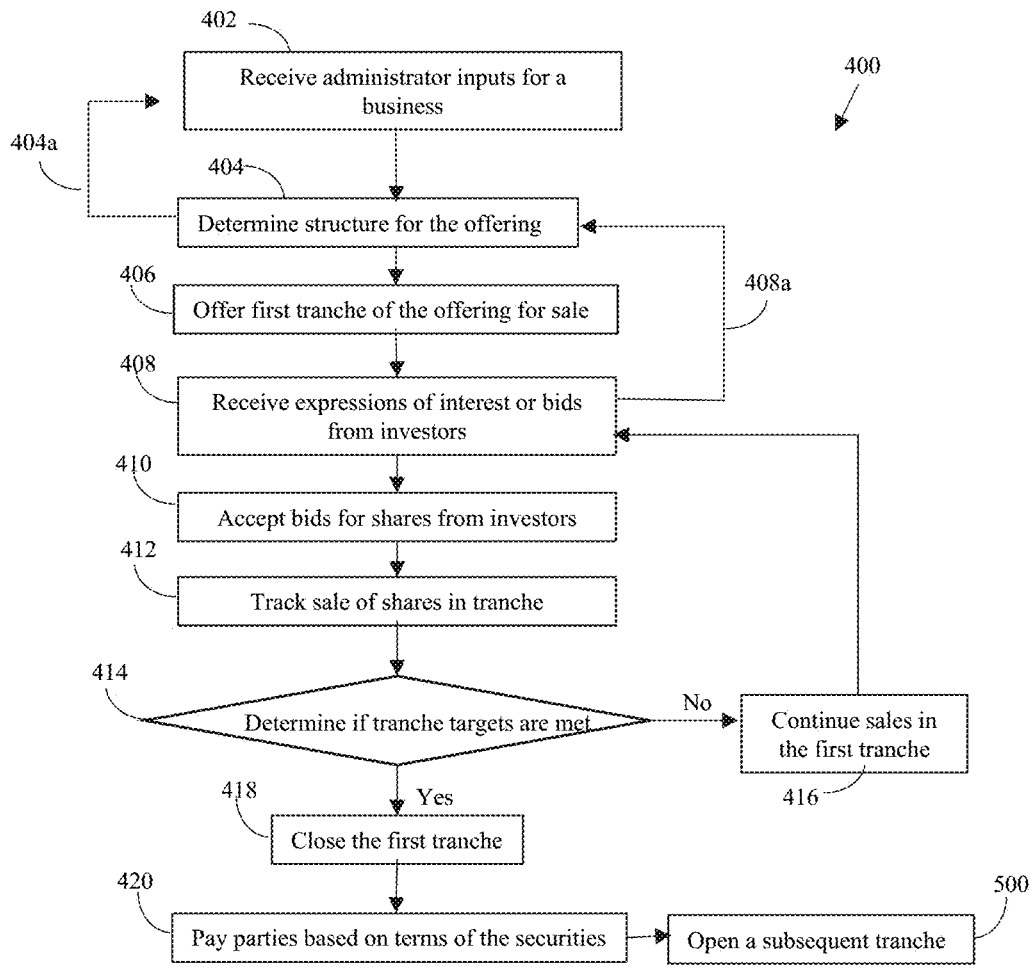
FIG. 4 shows a process flow diagram for defining, offering for sale and administering a first tranche of securities related to cascading IPOs according to an embodiment of the disclosed subject matter.

FIG. 4 shows a process flow diagram 400 for defining and offering securities for sale by the incubator company 110 according to an embodiment of the disclosed subject matter. As used herein, the first tranche may be sale of shares in the first company to investors. As discussed herein a portion of the proceeds of the sale of the first tranche may be held back to temporarily fund activities related to funding for a second company.

The process flow diagram 400 starts at block 402 wherein the computer system receives inputs from administrator(s) representing the seller (e.g. company 100 and incubator 110) regarding a capitalization effort such as an IPO to be offered as described herein. Inputs include a target amount of capital to be raised, information regarding company 100's current and potential valuation, etc.

The computer system determines a structure for the security in block 404. The determination of the structure comprises conducting activities in blocks 221, 222 and 223 of FIG. 2B. It is to be appreciated that defining the structure of the offering in block 404 may comprise several iterative interactions between the computer system and administrator(s) or seller(s) to define the final structure of the security (arrow 404*a*).

Once the structure of the offering is determined, the computer system moves to executing the offering (block 251 of FIG. 2B) by moving to block 406. Block 406 comprises offering the security for sale to potential investors. Block 408 comprises receiving "bids" for securities from investors. As discussed above, in some embodiments, a "bid" may comprise a potential buyer expressing interest in purchasing shares of the security in response to pre-sale information disclosures provided by the seller and/or incubator, such as in roadshows, or queries about the security which is not currently offered for sale. In embodiments wherein an investor expresses interest or initiates a query, the expressed interest or query is directed by the system from the investor into block 404 of the process flow scheme (arrow 408a) for analysis and response from the seller(s). It is to be appreciated that defining the structure of the security in block 404 based on buyer-initiated inputs may comprise several iterative interactions among the computer system, administrator(s) or seller(s) and investors (arrows 404a and 408a) to define the final structure of the security. "Bids" also refers to offers to purchase shares of the security by one or more investors after the final structure of the security is defined.

Once the final structure of the offering is determined, the computer system moves to executing the offering (block 240 of FIG. 2) by moving to block 406. Block 406 comprises offering the first tranche of securities in the first price category for sale to potential investors. Block 408 comprises receiving bids for securities from investors. Block 410 comprises accepting the bids from investors. Accepting the bids includes issuing securities to the investors at their bid price(s) and holding them in the computer system. As described above, acceptance of the bids by sellers may comprise generation of a smart contract that defines the final terms and conditions of the security, including payouts and triggering events.

The system tracks the sales of securities in block 412, including the total number of securities sold and the prices offered in bids and accepted by the computer system and the holders of the securities using a distributed ledger such as a blockchain. As the computer system tracks share sales it determines whether targets of the first tranche have been met in block 414. Targets may include securities in the first tranche being sold out, bid prices reaching a target price related to the offering price of the second tranche, target funding raised, time period for offering the first tranche expiring, or any combination thereof. If the target(s) are not reached, the computer system moves to block 416 to continue offering securities in the first offering, returning to block 408 and receiving more bids from investors.

If the computer system determines that the target(s) are reached in block 414, the computer system moves to block 418 and closes the first tranche. After closing the first tranche, the computer system moves to block 420 to make payments to parties depending on the terms of the securities and then moves to block 500 to open and offer a second (subsequent) tranche. Second and subsequent tranches may relate to funding second and subsequent companies following initial funding of the first company.

The system and methods described herein may be used for private offerings, initial public offerings or combinations thereof. For example, securities may be offered to a limited number of private capital entities. It is to be appreciated that the terms and conditions of the cascading funding securities are defined in a smart contract, so different smart contracts can be negotiated by different investors. For example, in a private offering each private capital entity may be able to negotiate terms and conditions separately from other private capital entities. In other examples, investors such as preferred investors, angel investors, accredited investors or investors willing and able to invest larger sums may obtain better terms than smaller investors. For example, such investors may be able to negotiate with the seller to define terms and conditions for a smart contract, while smaller investors may be limited to purchasing a security where the terms and conditions for a payout are non-negotiable. Further, since the goal of the cascading funding system described herein is a first initial public offering for a first company and a subsequent initial public offering for a second company, investments in the first and second companies may involve public investors.

Figure 5:
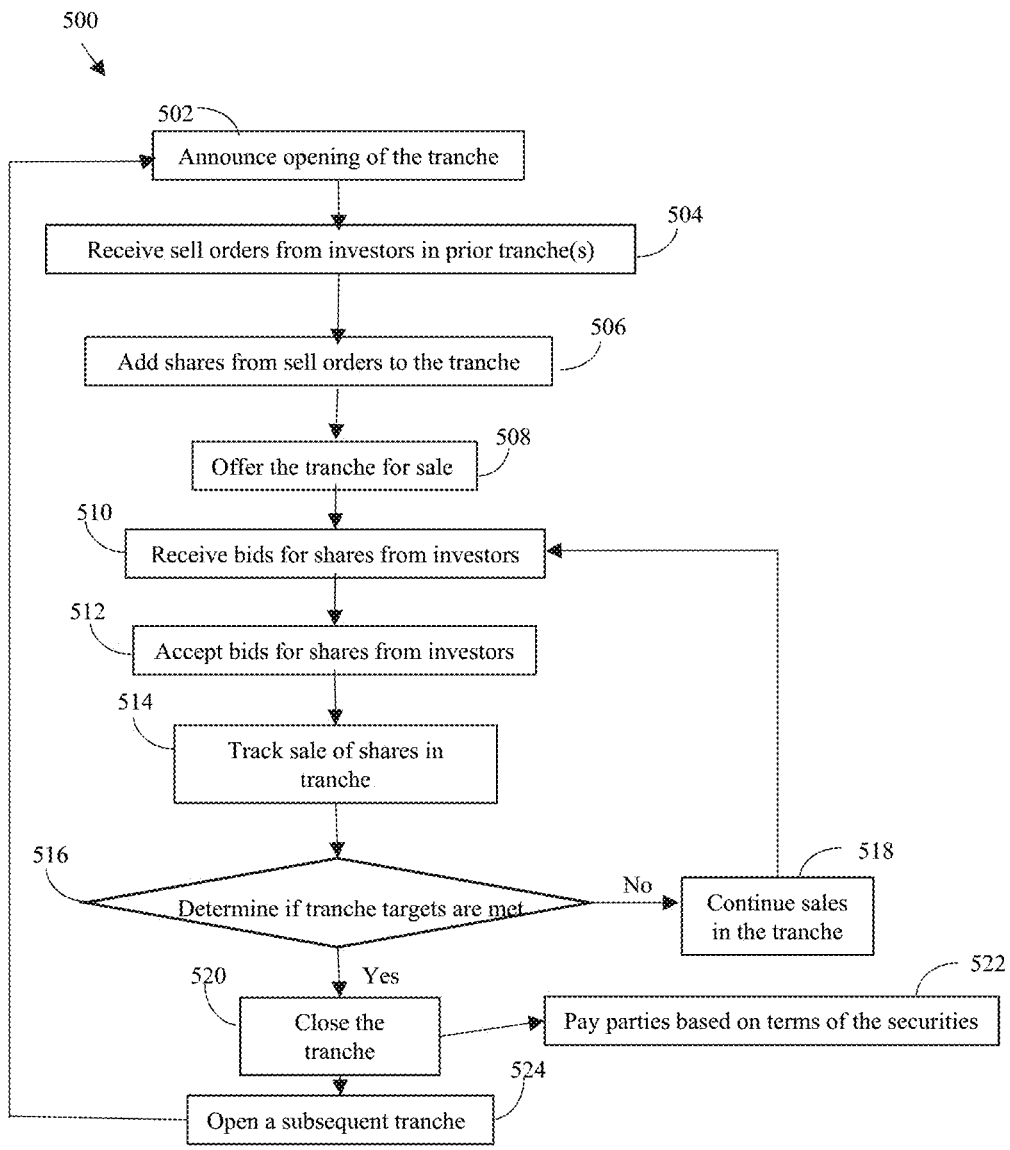
FIG. 5 shows a process flow diagram for offering for sale of subsequent tranches of securities related to cascading IPOs according to an embodiment of the disclosed subject matter.

FIG. 5 shows a process flow diagram for offering for sale of subsequent tranches of an IPO offering comprising more than one tranche. FIG. 5 shows the process 500 for opening and offering for sale of the second tranche and any other subsequent tranches.

In block 502, the computer system announces the opening of the second or subsequent tranches, which includes announcing the terms and conditions of the tranche and setting the opening asking price of the tranche. In block 504, the computer system receives sell orders for securities bought in the prior tranches from owners of securities wishing to sell securities. When the subsequent tranche is the second tranche the first tranche is the prior tranche. When the subsequent tranche is the third tranche, the first tranche and the second tranche are the prior tranches, etc. In block 506, the computer system adds the securities designated in the sell orders in block 504 to the subsequent tranche for sale to new investors, or pays the sellers the exit price, depending on the terms and conditions of the securities. New investors may include investors who had not participated in the prior tranche and/or investors in the prior tranche who wish to increase or modify their holdings. In block 510, the computer system receives bids for securities from investors. Bids can be made for the securities from the prior tranche or from the current tranche. Block 512 comprises accepting the bids from investors. Bids for securities from prior tranches are accepted first, then bids for securities from the current tranche. Accepting the bids includes issuing securities to the investors at their bid price(s) and holding them in the computer system.

The system tracks the sales of securities in block 514, including the total number of securities sold and the prices offered in bids and accepted by the computer system. As the computer system tracks share sales it determines whether targets of the current tranche have been met in block 516. Targets may include securities in the prior and current tranche(s) being sold out, bid prices reaching a target price related to the offering price of a subsequent tranche, target funding raised, time period for offering the current tranche expiring, or any combination thereof. If the target(s) are not reached, the computer system moves to block 518 to continue offering securities in the tranche, returning to block 510 and receiving more bids from investors.

If the computer system determines that the target(s) are reached in block 516, the computer system moves to block 520 and closes the current tranche. After closing the current tranche, the computer system moves to block 522 to make payments to parties depending on the terms of the securities. Also after closing the current tranche, the computer system moves to block 524 to open and offer a subsequent tranche by returning to block 502 to announce opening of the subsequent tranche. The process of opening and closing tranches summarized in process flow 500 is continued until all securities in all planned tranches are sold to investors. When all securities are sold, the computer system will end the process in block 522.

While the final tranche may be closed, the computer system may continue administering securities for the investors, allowing them to buy and sell securities within the system. If it is desirable to raise additional capital for the company, the process flow may return to block 402 for the computer system to define a new tranche or tranches to be offered.

Figure 6A:
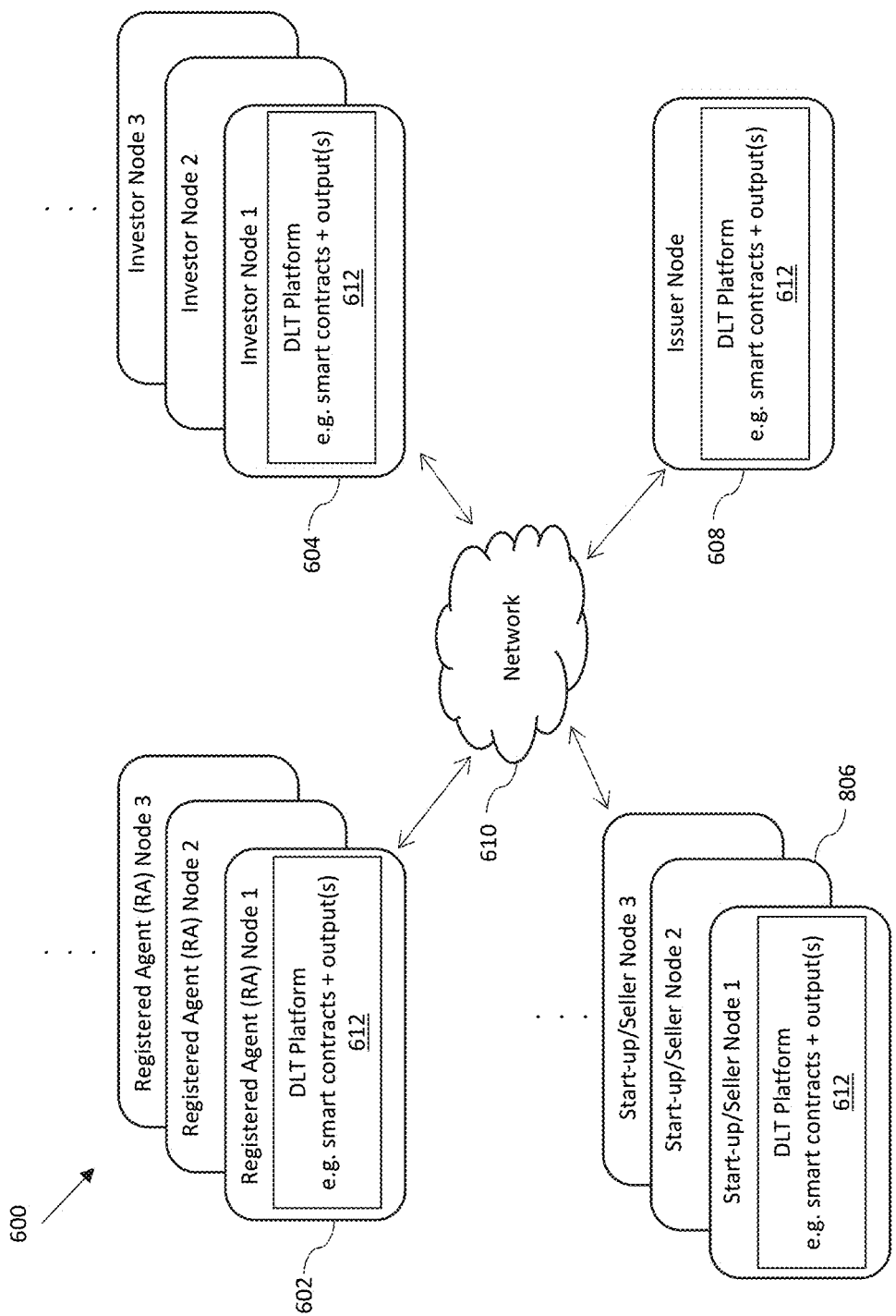
FIGS. 6A and 6B depict distributed networked systems for a cascading funding platform according to embodiments of the disclosed subject matter.
Figure 6B:
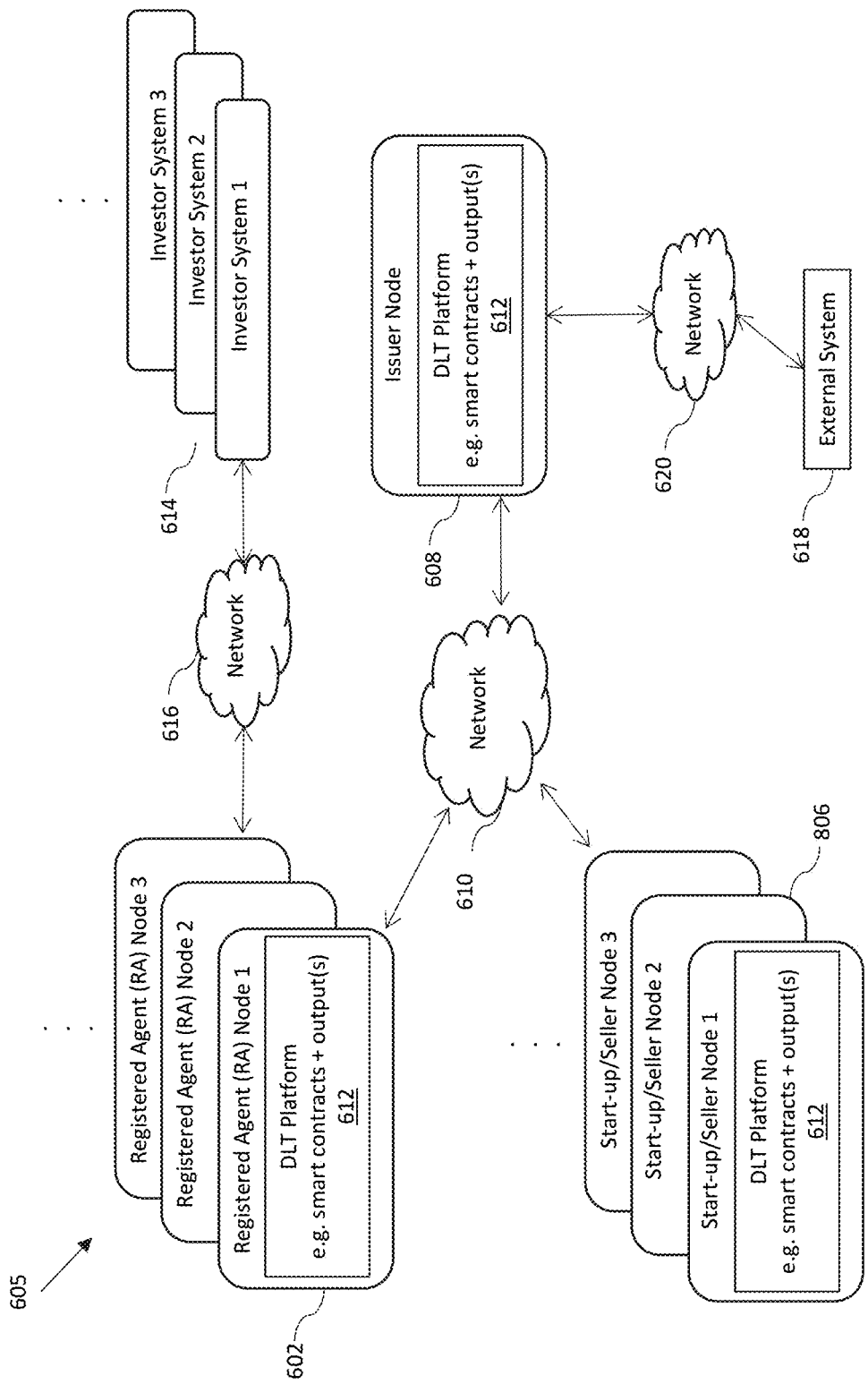

FIGS. 6A and 6B are schematic diagrams illustrating example embodiments of a system comprising nodes and users that may be involved in a smart system for cascading funding utilizing one or more smart contracts on a distributed ledger technology platform. A node is a connection point in a communications network and allow users to interact with the network. Each node is an endpoint for data transmissions or redistribution. Nodes have either a programmed or engineered capability to recognize, process and forward transmissions to other network nodes As illustrated in FIG. 6A, in some embodiments, a smart cascading funding platform 600 can comprise one or more registered agent (RA) or dealer nodes 602, one or more investor nodes 604, one or more asset owner (seller) nodes 606, and/or a central authority node 608, which can be in communication with one another through a network 610. The investor nodes 604 may be used by users (investors) subscribing to the platform to find and invest in companies of interest to the investor. The owner (seller) nodes 606 comprise the first and second companies seeking funding and/or special purpose vehicle companies holding assets of the first and second companies. The central authority node 608 is held by the issuer of the shares, such as an Incubator Company. In some embodiments, one or more of the RA node(s) 602, investor node(s) 604, asset owner node(s) 606, and central authority node 608, such as a node controlled by the Incubator Company, can comprise a DLT platform 612 on which the smart cascading platform, one or more smart contracts and smart contract outputs thereof, and/or one or more private data sharing channels may be implemented. In some embodiments, the DLT platform 612 can be configured to facilitate the filing, tracking, management, communications, notifications, or the like of the smart platform as described herein. In some embodiments, the system 600 may also include an external system 618 as described below with regard to FIG. 6B.

As illustrated in FIG. 6B, in some embodiments of a cascading funding platform 805, one or more investor systems 614 may not comprise a DLT platform. Rather, the one or more investor systems 614 can be configured to communicate with one or more RA nodes 602 comprising a DLT platform 612 through a separate network 616, for example through an application programming interface ("API"). As such, in some embodiments, one or more investor systems 614 may not be on the DLT itself. For example, small investors may be able to purchase securities from a registered agent or dealer in the distributed network, who is authorized to negotiate terms and conditions of the smart contracts on behalf of small investors. The RA may negotiate the terms and conditions prior to or after engaging with investors not on the DLT itself. Further, in some embodiments, a central authority node 808 can be configured to maintain a separate external system 618. In some embodiments, the separate external system 618 can be in communication with the central authority node 608 through a separate network connection 620, such as an API, for example for purposes of maintaining legally valid versions of the cascading funding filings. In some embodiments, the smart filings on the DLT itself can be the legally valid and canonical version of the filings. In embodiments, the external system may also include modules for managing the funding that are desirably kept separate from the distributed ledger. For example, owner confidential information and pre-issuance activities such as valuation of and administering securities (e.g. blocks 220 and 250 of FIGS. 2A and 2B and blocks 402 and 404 of FIG. 4) may be held in the separate external system. In other embodiments, the smart cascading funding platform may comprise a combination of investors 604 with nodes on the distributed ledger and investors 614 without nodes on the distributed ledger.

Aspects of the disclosure relate to funding companies using a cascading financing scheme wherein a portion of proceeds for funding a first company from a first initial public offering are held back to fund activities for funding a second company via a subsequent initial public offering before being paid out to investors.

Provided herein is a system for financing a company comprising an incubator financial firm configured to manage activities related to raising funds for the company against an equity participation and a put option on this equity participation to the issuer; and a special vehicle firm that holds all assets of the entity seeking financing; wherein the incubator financial firm defines an investor offering to raise funds from investors against a share of the capital prior to the initial public offering (IPO) and a pro rata share of the raised funds payable after the IPO and wherein a portion of the proceeds of the IPO is used to fund a subsequent IPO.

Embodiments of the system include those wherein a portion of funds advanced by investors are returned to investors via a pass-through security based on revenues from sale of equity shares in the subsequent IPO.

Also provided is a company for financing a company comprising a financial firm configured to manage activities related to raising funds for the company against an equity participation and a put option on this equity participation to the issuer wherein the financial firm defines an investor offering to raise funds from investors against a share of the capital prior to the IPO and a pro rata share of the raised funds payable after the IPO and wherein a portion of the proceeds of the IPO is used temporarily to fund a subsequent IPO.

Embodiments of the company include those wherein a portion of funds advanced by investors are returned to investors via a pass-through security based on revenues from sale of equity shares in the subsequent IPO.

Also provided is a method for financing a company comprising establishing an incubator financial firm configured to manage activities related to raising funds for the company in an IPO against an equity participation and a put option on this equity participation to the issuer, wherein the incubator financial firm defines an investor offering to raise funds from investors against a share of the capital prior to the IPO and a pro rata share of the raised funds payable after the IPO and wherein a portion of the proceeds of the IPO is used temporarily to fund a subsequent IPO; and establishing a special vehicle firm that holds all assets of the entity seeking financing.

Embodiments of the method include those further comprising defining an offering for sale of investment shares in a first company; receiving bids from investors for purchase of the investment shares; accepting the bids from investors; tracking revenue associated with the sale of the investment shares; retaining a portion of revenue associated with the sale of the investment shares to fund an offering for sale of investment shares in a subsequent company; and paying parties a portion of the revenue from sale of investment shares in the subsequent company as it is received.

Also provided is a system comprising a computerized system with hardware and specialized software components for developing, executing and administering sale of securities, the system comprising a non-transitory computer readable storage medium comprising a plurality of computer readable instructions embodied thereon which, when executed by the computerized system, causes the computerized system to: define an offering for sale of investment shares in a first company; receive bids from investors for purchase of the investment shares; accept the bids from investors; track revenue associated with the sale of the investment shares; retain a portion of revenue associated with the sale of the investment shares to fund an offering for sale of investment shares in a subsequent company; and pay parties a portion of the revenue from sale of investment shares in the subsequent company as it is received.

Also provided is a non-transitory computer readable storage medium comprising a plurality of computer readable instructions embodied thereon wherein the instructions, when executed by a computerized system with hardware and specialized software components for developing, executing and administering securities, cause the computerized system to: define an offering for sale of investment shares in a first company; receive bids from investors for purchase of the investment shares; accept the bids from investors; track revenue associated with the sale of the investment shares; retain a portion of revenue associated with the sale of the investment shares to fund an offering for sale of investment shares in a subsequent company; and pay parties a portion of the revenue from sale of investment shares in the subsequent company as it is received.

The system and methods described herein may be used for private offerings, initial public offerings or combinations thereof. For example, all tranches may be offered to a limited number of private capital entities. In other embodiments early tranches may be offered to a limited number of private capital entities, while later tranches may be offered in an initial public offering.

The invention claimed is:

1. A system for providing a cascading funding platform, the system comprising:
  a plurality of processors comprising at least a first processor, a second processor and a third processor;
  one or more memories operatively coupled to the plurality of processors having instructions stored thereon that, when executed by at least one of the plurality of processors, cause:
  the first processor to determine a funding event comprising receiving inputs via a communications module regarding a capitalization effort for a first company and communicate the funding event to a securities planning module;
  the securities planning module comprising the second processor on receiving the funding event from the first processor to determine a structure for a first initial public offering to fund the first company and a structure for a subsequent initial public offering for a second company by establishing a target amount to be raised, identifying variables and ranges of acceptable values for the variables, modeling multiple alternative values of one or more individual variables and combination of variables, and evaluating the multiple alternative values to select one or more sets of variables that meet targets for the first initial public offering and the subsequent initial public offering;
  the securities planning module comprising the third processor, on receiving the funding event from the first processor and the structure for the structure for a first initial public offering to fund the first company and the structure for a subsequent initial public offering for the second company from the second processor, to define terms and conditions of a pass-through security to fund the first company wherein a pro rata share of the raised funds is payable after the first initial public offering, a portion of the proceeds of the first initial public offering is to be held back to fund the subsequent initial public offering for the second company and a pro rata share of the raised funds is payable after the subsequent initial public offering; and
  a distributed ledger; and
  a cascading funding platform comprising an administration module, a financial transactions module and a smart contract module operationally connected to the first processor, the second processor, the third processor and the distributed ledger, the administration module configured to
  receive the funding event;
  generate, based on receiving the pass-through security from the third processor, a message related to an initial subscriber offering of the pass-through security;
  send the message to one or more networked nodes associated with one or more subscribers of the platform wherein the message comprises informing the one or more subscribers of the terms and conditions of the pass-through security;
  receive bids to purchase funding tokens via the one or more networked nodes from the one or more subscribers in response to the message, wherein the funding tokens represent shares in the pass-through security;
  determine allocation of tokens to the one or more subscribers based on the bids;
  instruct the financial transactions module to manage payments from the one or more subscribers to cover their bids, payments to parties and collection of transaction fees;
  record bids for the funding tokens and respective allocated tokens to the distributed ledger, wherein the distributed ledger is accessible by the one or more networked nodes;
  receive the first initial public offering for the first company wherein a first portion of the proceeds from the purchase of the funding tokens are used to fund the first initial public offering;
  generate, based on receiving the first initial public offering, a message related to the first initial public offering;
  send the message to one or more networked nodes associated with one or more owners of the funding tokens; wherein the message comprises informing the one or more owners that a pro rata share of the raised funds is payable to the one or more owners after the first initial public offering, that a portion of the proceeds of the first initial public offering is to be held back to fund the subsequent initial public offering for the second company and that a pro rata share of the raised funds is payable to the one or more owners after the subsequent initial public offering;
  transmit to the smart contract module compiled code corresponding to a plurality of smart contracts to a special receiver address on the distributed ledger, the smart contract module accessible to the one or more networked nodes associated with the one or more owners of the funding tokens, wherein each smart contract comprises immutable self-executing code configured to
  determine a payout triggering event; and
  execute a plurality of predetermined electronic actions for generating a smart contract output when the payout triggering event is met, wherein the smart contract module generates instructions to the financial transactions module to execute a payout to the one or more owners automatically when the payout event is triggered, and record execution of the smart contract to the distributed ledger.

2. The system of claim 1 wherein a first payout event is completion of the first initial public offering.

3. The system of claim 2, wherein the payout is a pro rata share of the funds raised by the first initial public offering.

4. The system of claim 1 wherein a second payout event is completion of the subsequent initial public offering.

5. The system of claim 4, wherein the payout is a pro rata share of the funds raised by the subsequent initial public offering.

6. The system of claim 1, further configured to execute the program instructions to cause the computing system to:
   receive, from a plurality of networked nodes, a plurality of bids for one or more funding tokens from a plurality of investors,
   determine a fractional share of the funding tokens to allocate to each of the plurality of investors based on the respective bids associated with each investor; and
   allocate the fractional shares of the funding tokens to each of the plurality of investors.

7. The system of claim 1 wherein the smart contract is between an issuer of the funding tokens and an investor in the funding tokens.

8. The system of claim 1 wherein the first processor configured to determine the funding event is isolated from the distributed ledger of the cascading funding platform.

9. The system of claim 1 wherein the second processor and the third processor are isolated from the distributed ledger of the cascading funding platform.

* * * * *